(12) United States Patent
Goldberg

(10) Patent No.: US 8,402,361 B2
(45) Date of Patent: Mar. 19, 2013

(54) METHODS AND SYSTEMS FOR IMPLEMENTING A DYNAMIC HIERARCHICAL DATA VIEWER

(75) Inventor: Joseph H. Goldberg, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 675 days.

(21) Appl. No.: 12/241,116

(22) Filed: Sep. 30, 2008

(65) Prior Publication Data

US 2009/0049372 A1 Feb. 19, 2009

Related U.S. Application Data

(63) Continuation-in-part of application No. 10/985,531, filed on Nov. 9, 2004.

(51) Int. Cl.
*G06F 17/00* (2006.01)
(52) U.S. Cl. ........ 715/212; 715/200; 715/213; 715/214; 715/215; 715/216; 715/217; 715/218; 715/219; 715/220
(58) Field of Classification Search ................... 715/200, 715/212–220
See application file for complete search history.

(56) References Cited

U.S. PATENT DOCUMENTS

| | | | |
|---|---|---|---|
| 5,255,356 A | 10/1993 | Michelman et al. | |
| 5,632,009 A | 5/1997 | Rao et al. | |
| 5,657,437 A | 8/1997 | Bishop et al. | |
| 5,880,742 A | 3/1999 | Rao et al. | |
| 5,883,635 A | 3/1999 | Rao et al. | |
| 5,884,306 A | 3/1999 | Bliss et al. | |
| 5,970,493 A | 10/1999 | Shoup et al. | |
| 6,085,202 A | 7/2000 | Rao et al. | |
| 6,205,453 B1 | 3/2001 | Tucker et al. | |
| 6,317,750 B1 | 11/2001 | Tortolani et al. | |
| 6,626,959 B1 | 9/2003 | Moise et al. | |
| 6,628,312 B1 | 9/2003 | Rao et al. | |
| 6,775,675 B1 | 8/2004 | Nwabueze et al. | |
| 7,062,502 B1 | 6/2006 | Kesler | |
| 7,363,306 B1 * | 4/2008 | Hao et al. .................. | 715/215 |
| 7,379,934 B1 | 5/2008 | Forman et al. | |
| 7,401,094 B1 | 7/2008 | Kesler | |
| 7,512,875 B2 * | 3/2009 | Davis ......................... | 715/215 |
| 7,559,023 B2 * | 7/2009 | Hays et al. ................. | 715/255 |
| 8,060,817 B2 | 11/2011 | Goldberg et al. | |
| 8,261,181 B2 * | 9/2012 | Tien et al. .................. | 715/230 |

(Continued)

OTHER PUBLICATIONS

Microsoft, "Microsoft Excel 2003", Microsoft, Fig 0-10b (24 pages total).*

(Continued)

*Primary Examiner* — Cesar Paula
*Assistant Examiner* — David Faber
(74) *Attorney, Agent, or Firm* — Kilpatrick Townsend & Stockton

(57) ABSTRACT

Methods, systems, and machine-readable mediums are disclosed for viewing multiply-dimensioned data. In one embodiment, a method is disclosed which comprises displaying multiply-dimensioned data in a table format, the table format having a plurality of rows, a plurality of columns, and a plurality of cells displaying data, a first column of the plurality of columns including data having at least two hierarchical levels. Data for at least a first set of the plurality of cells is displayed in a graphical format, the first set including cells in the first column, the graphical format of the cells in the first set in the first column indicating a hierarchical level associated with the cell data and a mechanism is displayed for a first one of the rows to display at least one additional row having data in the first column associated with a lower hierarchical level of the first row data.

18 Claims, 11 Drawing Sheets

U.S. PATENT DOCUMENTS

| | | | |
|---|---|---|---|
| 2002/0069221 | A1 | 6/2002 | Rao et al. |
| 2002/0091728 | A1* | 7/2002 | Kjaer et al. ............... 707/503 |
| 2005/0289455 | A1 | 12/2005 | Hays et al. |
| 2006/0085744 | A1 | 4/2006 | Hays et al. |
| 2006/0101324 | A1 | 5/2006 | Goldberg et al. |
| 2006/0129913 | A1 | 6/2006 | Vigessa et al. |
| 2006/0288284 | A1* | 12/2006 | Peters et al. ............... 715/700 |
| 2007/0101252 | A1* | 5/2007 | Chamberlain et al. ........ 715/503 |
| 2007/0204212 | A1* | 8/2007 | Chamberlain et al. ........ 715/503 |
| 2009/0083613 | A1* | 3/2009 | Davis ............... 715/212 |
| 2009/0089662 | A1* | 4/2009 | Wulkan et al. ............... 715/245 |

OTHER PUBLICATIONS

Keizer, George, "Microsoft Office System—CNET Reviews", Oct. 21, 2003, CNET pp. 1-18.*

Microsoft, "Microsoft Excel 2003", Microsoft, Fig 11(a-u), 12a-b, 13a-f & pp. 3-4 (31 pages total).*

Microsoft, "Microsoft Excel 2000", 1999, Microsoft, Fig 20(a-t), 21a-b, 22a-c & pp. 1-2 (27 pages total).

Microsoft, "Microsoft Excel 2000", 1999, Microsoft, FIGs 19(a-j), 10 pages.

U.S. Appl. No. 10/985,531, Office Action dated Nov. 16, 2006, 17 pages.

U.S. Appl. No. 10/985,531, Final Office Action dated Apr. 4, 2007, 21 pages.

U.S. Appl. No. 10/985,531, Office Action dated Jul. 24, 2007, 15 pages.

U.S. Appl. No. 10/985,531, Final Office Action dated Dec. 28, 2007, 16 pages.

U.S. Appl. No. 10/985,531, Office Action dated Jun. 9, 2008, 18 pages.

U.S. Appl. No. 10/985,531, Final Office Action dated Oct. 16, 2008, 20 pages.

U.S. Appl. No. 10/985,531, Advisory Action dated Dec. 19, 2008, 3 pages.

U.S. Appl. No. 10/985,531, Office Action dated Mar. 18, 2009, 21 pages.

U.S. Appl. No. 10/985,531, Final Office Action dated Aug. 20, 2009, 20 pages.

U.S. Appl. No. 10/985,531, Advisory Action dated Nov. 2, 2009, 2 pages.

U.S. Appl. No. 10/985,531, Office Action dated Jan. 21, 2009, 23 pages.

U.S. Appl. No. 10/985,531, Office Action dated Jan. 21, 2010, 23 pages.

U.S. Appl. No. 10/985,531, Final Office Action dated Jun. 9, 2010, 23 pages.

Microsoft, "Microsoft Excel 2000," 1999, Microsoft, Fig 23(a-u), 24a-b, & p. 3 (24 pages total).

Blattner, "Special Editing Using Microsoft Office Excel 2003", Sep. 11, 2003, Que, pp. 1-8.

ILOG JViews Visualization Products, http://www.ilog.com/products/jviews, Apr. 29, 2005 ILog, Inc., pp. 1-2.

Microsoft, "Microsoft Excel 2000", 1999, Microsoft, Figs. 1-17b (44 pages).

U.S. Appl. No. 10/985,531, Notice of Allowance dated Feb. 23, 2011, 13 pages.

\* cited by examiner

| ✓ | Target | # Children | # Descendants | Availability | Ave. Response Time ms ↓ | Slowest Response Time ms | Stat |
|---|---|---|---|---|---|---|---|
| ☑ | ⊞ My Bike Shop | 14 | 28 | 0037 | 0992 | 2033 | 0002 |
| ☑ | ⊞ Storefront Page | 4 | 4 | 0025 | 0784 | 1633 | 0001 |
| ☑ | Browse Wheel Repair Info | 0 | 0 | 0036 | 0489 | 0986 | 0001 |
| ☑ | App19 | 0 | 0 | 0007 | 0915 | 1848 | 0002 |
| ☑ | App11 | 0 | 0 | 0072 | 0864 | 1764 | 0001 |
| ☑ | App26 | 0 | 0 | 0088 | 0757 | 1605 | 0001 |
| ☑ | App3 | 0 | 0 | 0007 | 0340 | 0772 | 0002 |

Fig. 6

METHODS AND SYSTEMS FOR IMPLEMENTING A DYNAMIC HIERARCHICAL DATA VIEWER

PRIORITY CLAIM

This application is a continuation-in-part of U.S. patent application Ser. No. 10/985,531, entitled DATA VIEWER, filed on Nov. 9, 2004, which is incorporated by reference in its entirety for any and all purposes, and priority is claimed thereto.

BACKGROUND OF THE INVENTION

Data may be displayed in any number of different ways. One traditional approach that has been used to display data is a tabular representation. In a tabular representation, data is displayed in a table format with records displayed as rows in the table and attributes of the records displayed as columns. The attribute values are displayed in a textual format in cells (the intersection of a row and a column). With large data sets, a user has to scroll through multiple pages to view all the data. Additionally, this type of view does not facilitate rapid user comprehension of the data set.

Another technique that has been used is to display data in a table format, but instead of displaying the data values as textual values, the data is displayed as graphical bars. To get more detailed information, the user may specify a focus region to see the textual values of the data. This technique may allow a user to view large amounts of data on a single screen and more easily notice data trends with data sets having two or more dimensions of data. However, this type of display does not provide for the comprehension of hierarchical relationships in multiply-dimensioned data having multiple hierarchical levels.

BRIEF SUMMARY OF THE INVENTION

Methods, systems, and machine readable mediums are disclosed for viewing multiply-dimensioned data. In one embodiment, a method is disclosed which comprises displaying multiply-dimensioned data in a table format. The table format has a plurality of rows, a plurality of columns, and a plurality of cells displaying data. One column of the plurality of columns includes data for at least two hierarchical levels. Data for at least a first set of the plurality of cells is displayed in a graphical format. The first set includes cells in the first column and the graphical format of the cells in the first column indicates a hierarchical level associated with the cell data. By way of example, the graphical format may comprise graphical bars and the graphical bars may be indented to indicate the hierarchical level of the data in the first column. The method also comprises displaying a mechanism for a first one of the rows to display at least one additional row having data in the first column associated with a lower hierarchical level of the first row data.

The method may also comprise detecting an activation of the mechanism associated with a first one of the rows. The first row has data in the first column at a first hierarchical level. One or more additional rows are then displayed. The additional row(s) have data in the first column at a lower hierarchical level than the first hierarchical level and the data at the lower hierarchical level shares at least one data dimension with the data in the first cell data. In some embodiments, the one or more additional rows are displayed in the graphical format and the graphical format for data in the first column of the row(s) may indicate the lower hierarchical level. A mechanism associated with the first row may also be displayed to remove the one or more additional rows from the displayed data. Optionally, the user may select to expand or collapse all hierarchical levels of the displayed data and the data may be re-displayed in accordance with the user selection.

In some instances, the method may also comprise displaying the data for a second set of the plurality of cells in a textual format. The second set may include non-contiguous rows. Before the second set is displayed in the textual format, the second set may first be displayed in a graphical format. Upon detecting a selection of the second set, the table may be re-displayed to display the second set in the textual format. Alternately or additionally, the method may comprise detecting a selection of a row having data in the first set which is graphically represented. The data associated with the selected row may then be displayed in a textual format in a status line.

In other embodiments, the method may further comprise invoking a configuration interface having a plurality of configuration options for a user to change a configuration of the displayed data by either an end user or administrator. After a selection is received from a user to change a display mode configuration option, the data may be re-displayed in accordance with the selection. For example, one configuration option may be to display the data in the first set in the graphical format with textual values. As another example, configuration option(s) may be provided to set minimum/maximum threshold values for data. Data that exceeds a maximum threshold value or is less than a minimum threshold value may be displayed in a different format. Another configuration option may be to display the data in a list format so that when data is resorted, the hierarchical relationships between the rows is not maintained. Additional configuration options may be provided to change a top hierarchy level so that data above the top hierarchy level are not displayed, or only selected levels are displayed; to set the columns that are to be displayed; to display a number of descendents of a row; to change the graphical format (e.g., change the height or spacing of graphical bars); or to right-justify the graphical data of a column.

Other variations of the method are also contemplated. By way of example, the method may further include receiving a sort column selection. The data at a first hierarchical level may be sorted in accordance with the sort column selection and the sorted data may be displayed to maintain a display of the hierarchical relationship between rows of data. As another example, the method may include receiving a selection of one or more rows and re-displaying the table to include only the selected rows. Furthermore, the data may be sorted by children within parents first (i.e., bottom-up) or sorting with parents first (i.e., top-down).

In another embodiment, a method is disclosed which comprises displaying multiply-dimensioned data in a table format. The table format has a plurality of rows, a plurality of columns, and a plurality of cells displaying data. A first column of the plurality of columns includes data for at least two hierarchical levels. The data for at least a first set of the data is displayed in a graphical bar format. The graphical bars in the first column are indented to indicate the hierarchical level associated with the data in the first column. A selection of a subset of the first set is detected and the data for the subset is re-displayed in a textual format. The method also comprises detecting a selection of a row in the first set and displaying the data associated with the selected row in a textual format in a status line. In addition, color, grayscale, or other graphical treatment may be used to indicate hierarchical level.

The methods may be also be embodied in computer systems. The computer system may include a display, a processor, and memory communicatively coupled with the processor. The memory may include instructions, which, when executed by the processor cause the processor to display data in accordance with the embodiments described above. The computer system may also comprise data storage to store the data.

A further understanding of the nature and advantages of the present invention may be realized by reference to the remaining portions of the specification and the drawings.

BRIEF DESCRIPTION OF THE DRAWINGS

Illustrative embodiments in accordance with the invention are illustrated in the drawings in which:

FIG. 6 illustrates a third exemplary display of data using a data viewer.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
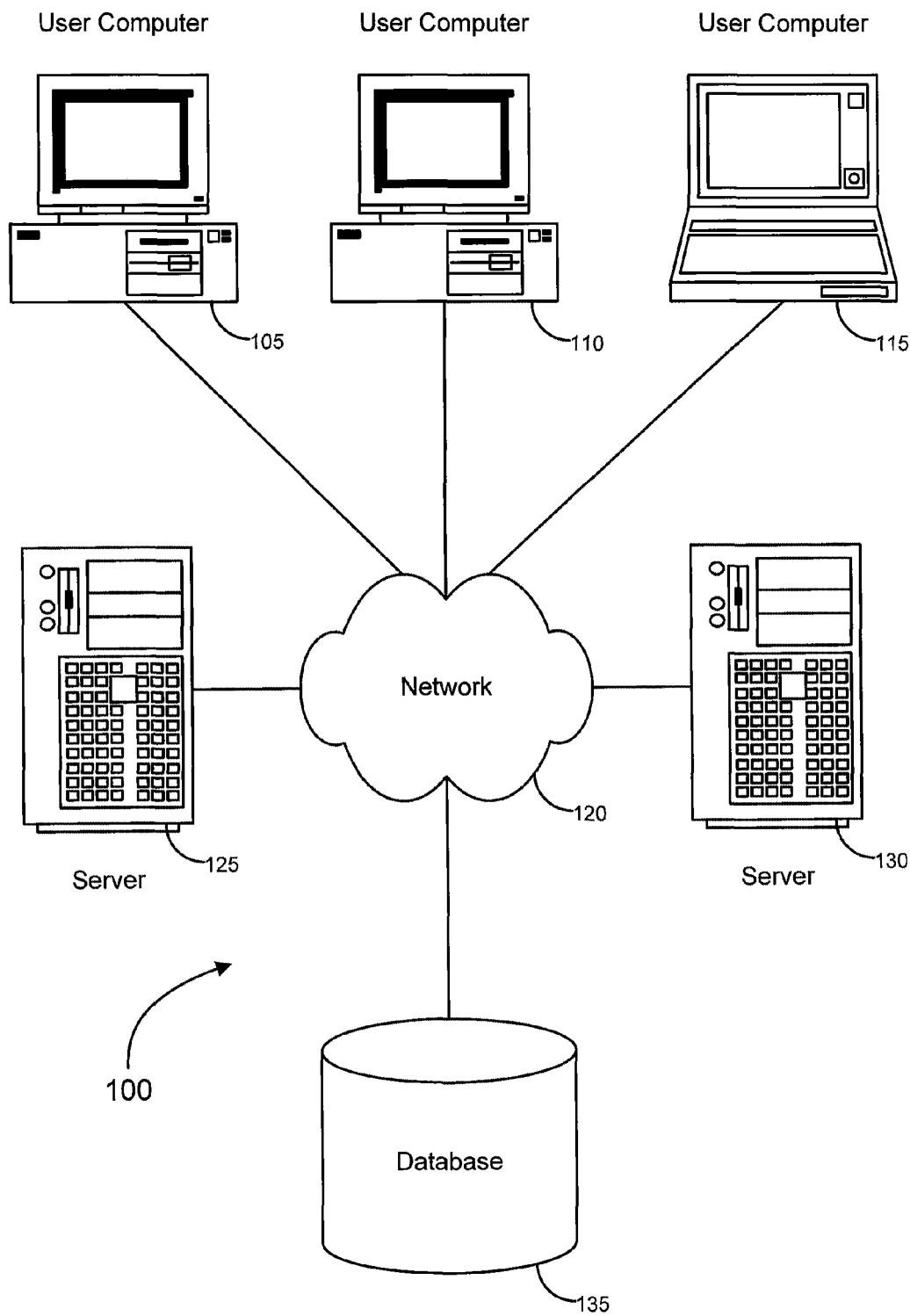
FIG. 1 is a block diagram of an exemplary computer network system environment in which a data viewer may be used.

FIG. 1 illustrates a block diagram of a system environment that may in which a data viewer may be used. The system 100 includes one or more user computers 105, 110, and 115. The user computers 105, 110, and 115 can be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 105, 110, 115 may also have any of a variety of applications, including for example, database client and/or server applications, and web browser applications. Alternatively, the user computers 105, 110, and 115 may be any other electronic device, such as a thin-client computer, Internet-enabled mobile telephone, and/or personal digital assistant, capable of communicating via a network (e.g., the network 120 described below) and/or displaying and navigating web pages or other types of electronic documents. Although the exemplary system 100 is shown with three user computers, any number of user computers may be supported.

In some embodiments, the system 100 may also include a network 120. The network may can be any type of network familiar to those skilled in the art that can support data communications using any of a variety of commercially-available protocols, including without limitation TCP/IP, SNA, IPX, AppleTalk, and the like. Merely by way of example, the network 120 may be a local area network ("LAN"), such as an Ethernet network, a Fiber Channel network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 125, 130. One server may be a web server 125, which may be used to process requests for web pages or other electronic documents from user computers 105, 110, and 120. The web server can be running an operating system including any of those discussed above, as well as any commercially-available server operating systems. The web server 125 can also run a variety of server applications, including HTTP servers, FTP servers, CGI servers, database servers, Java servers, and the like.

The system 100 may also include one or more file and or/application servers 130, which can, in addition to an operating system, include one or more applications accessible by a client running on one or more of the user computers 105, 110, 115. The server(s) 130 may be one or more general purpose computers capable of executing programs or scripts in response to the user computers 105, 110 and 115. As one example, the server(s) 130 may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 130 may also include database servers, including without limitation those commercially available from Oracle, Microsoft, Sybase™, IBM™ and the like, which can process requests from database clients running on a user computer 105, 110, 115.

In some embodiments, an application server 130 may create web pages dynamically for displaying user data. The web pages created by the web application server 130 may be forwarded to a user computer 105 via a web server 125. Similarly, the web server 125 can receive web page requests and/or input data from a user computer 105 and can forward the web page requests and/or input data to the web application server 130. In alternate embodiments, application server 130 may implement a Graphical User Interface (GUI), other than a web application, to display data.

In further embodiments, the server 130 may function as a file server. Although for ease of description, FIG. 1 illustrates a separate web server 125 and file/application server 130, those skilled in the art will recognize that the functions described with respect to servers 125, 130 may be performed by a single server and/or a plurality of specialized servers, depending on implementation-specific needs and parameters.

The system 100 may also include a database 135. The database 135 may reside in a variety of locations. By way of example, database 135 may reside on a storage medium local to (and/or resident in) one or more of the computers 105, 110, 115, 125, 130. Alternatively, database 135 may be remote from any or all of the computers 105, 110, 115, 125, 130, and in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g™, that is adapted to store, update, and retrieve data in response to SQL-formatted commands.

Figure 2:
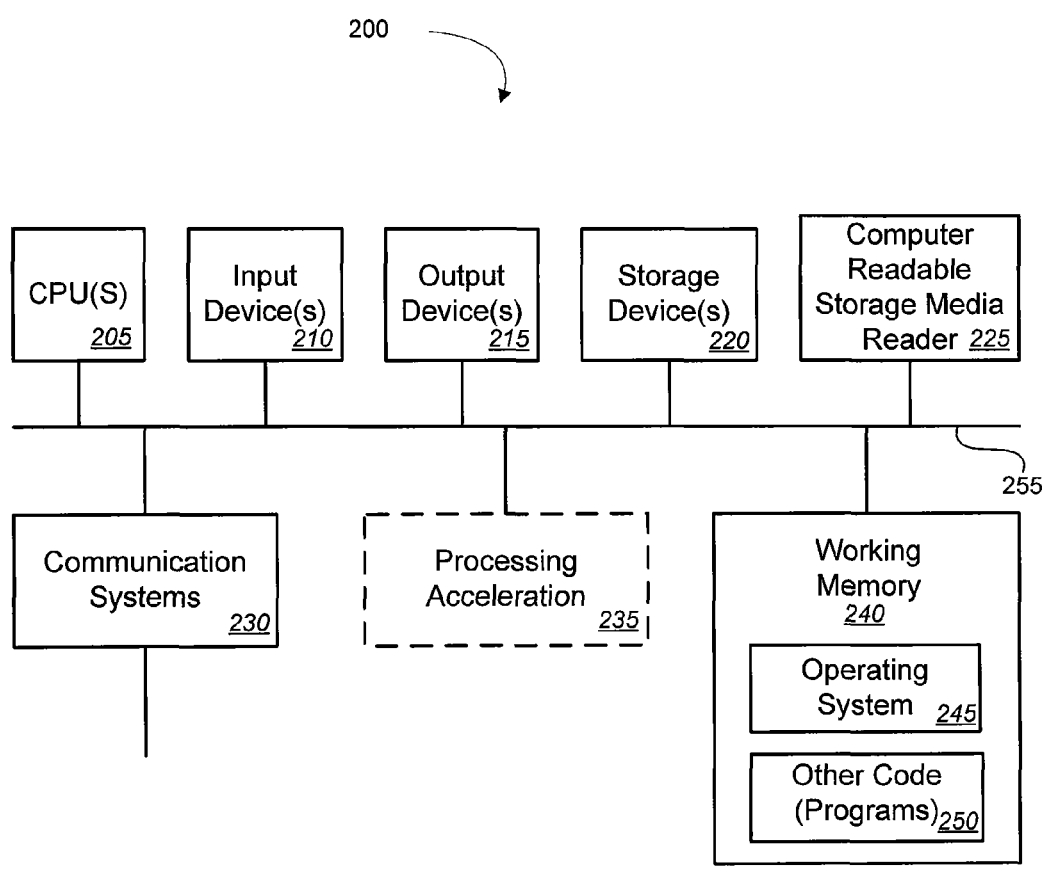
FIG. 2 is a block diagram of a computer system upon which a data viewer or components of a data viewer may be implemented.

FIG. 2 illustrates one embodiment of a computer system 200 upon which a data viewer or components of a data viewer may be implemented. The computer system 200 is shown comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a wireless or wired network card, an infra-red communication device, etc.); and working memory 240, which may include RAM and ROM devices as described above. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer.

The computer system 200 may also comprise software elements, shown as being currently located within a working memory 240, including an operating system 245 and/or other code 250, such as an application program. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

FIGS. 3-7 illustrate different exemplary data views that may be provided by a data viewer. For purposes of illustration, these figures illustrate a particular example of a type of data that may be displayed, that of data related to website performance. It should be appreciated that the illustrations are exemplary in nature and that data viewers may be used to view a wide variety of other types of data.

Figure 3:
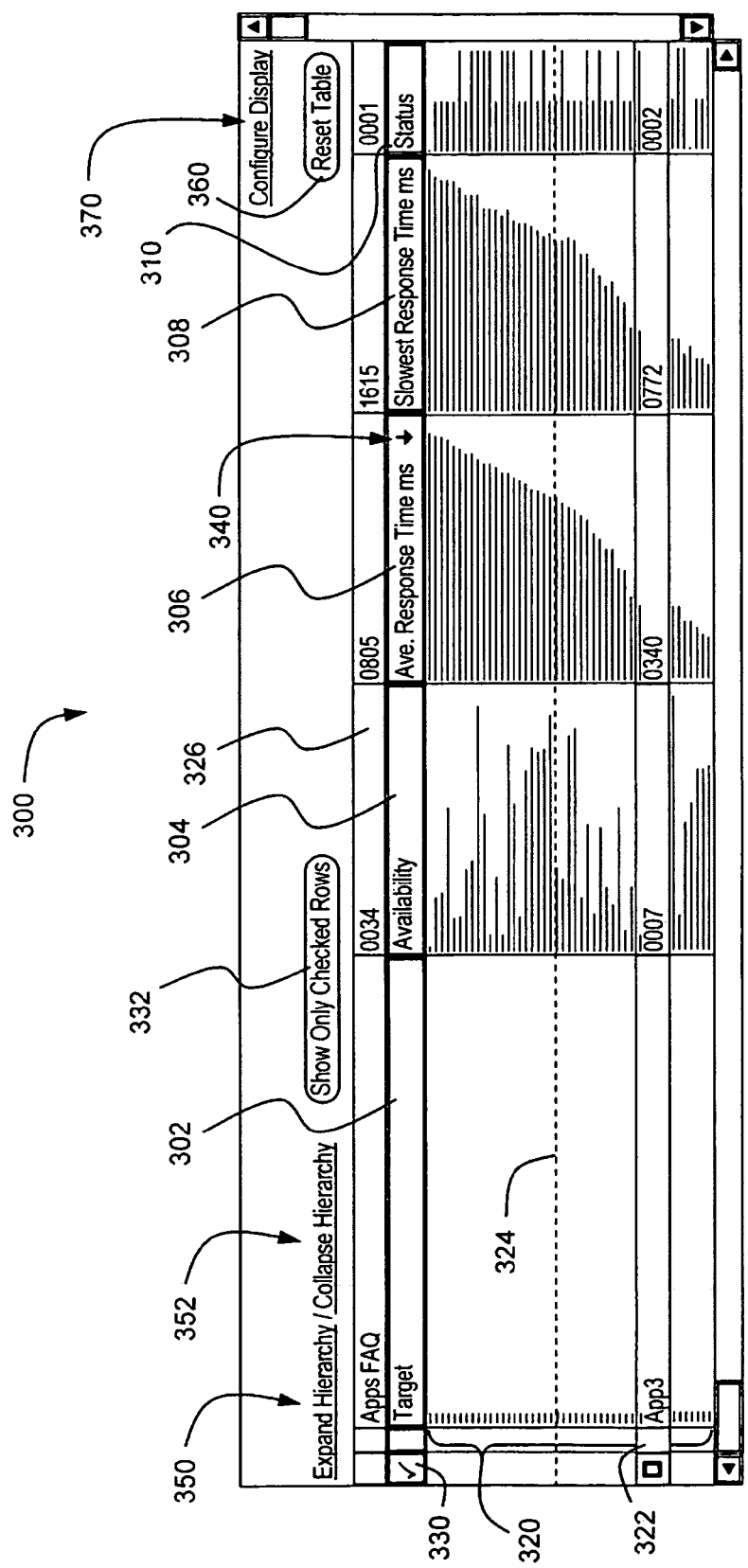
FIG. 3 illustrates an exemplary embodiment of a data viewer.

An exemplary embodiment of a data viewer that may be used to view multiply-dimensioned data is illustrated in FIG. 3. The data viewer 300 displays data in a table format. Attributes of data are displayed as columns 302, 304, 306, 308 and rows 320, 322 display related data. At the intersections of rows and columns are cells for displaying data values. In alternate embodiments, the related data may be displayed in columns, while attributes may be displayed in rows.

One of the columns 302 may be used to display data having multiple hierarchical levels having at least one data dimension in common. As illustrated in FIG. 3, column 302 is used to display web targets. Some of the web targets (parent) may have descendent targets. For instance, a website may consist of multiple pages and/or applications that each have their own associated data. Data for the entire website is at a higher hierarchical level than the data for the underlying pages/applications. One or more of the underlying pages may also have descendants. Another example of hierarchical data that could be displayed in a column 302 of a data viewer are product categories that have different hierarchical levels. A product category of writing instrument may have descendent categories of pencils, markers, pens (which may have descendants of ballpoint, roller ball, etc.). Numerous other examples of hierarchical data may also be displayed in a column 302 of the table.

In one view, the hierarchical data may be collapsed as shown in FIG. 3. When the hierarchy levels are collapsed, data is only displayed for a top hierarchy level (which may be configured as described below). Thus, in FIG. 3, data is displayed for each web target at the top hierarchy level. The displayed data includes the availability of web targets (displayed in column 304), the average response time of web targets (displayed in column 306), the slowest response time of web targets (displayed in column 308), and the status of the web targets (displayed in column 310).

Data for a first plurality of rows 320 is displayed in a graphical format. By way of example, the graphical format may comprise graphical bars. The graphical bars may take up less vertical screen area than textual data and may thus provide for the display of larger amounts of data on a single screen. Numerical data (e.g., availability 304, average response time 306, slowest response time 308) may be displayed so that the length of the bar indicates a larger number. Graphical bars (or other type of graphical format) may also be used for attributes having a pre-defined number of allowable values (yes/no, available/offline, etc.). For example, the status 310 of the website target may be displayed as graphical bars with an available status equated to a first numerical value (with a first bar length) and an offline status equated to a second numerical value (with a second bar length). Alternately, graphical bars may be indented to indicate different allowable values. Character data may also be displayed in graphical format to indicate information, such as the starting letter of the character data. This may be accomplished in any number of ways. For instance, the length of a graphical bar may indicate the position in the alphabet of the starting character or graphical bars may be indented to indicate the position in the alphabet of the starting character.

Hierarchical data may also be displayed in graphical format to indicate the hierarchical position of the cell data. In one embodiment, graphical bars may be used to display hierarchical level information. As will be illustrated in later figures, the hierarchical level of the data may be indicated by indenting the graphical bars for lower hierarchical levels. Alternately, the hierarchy level may be indicated by a length of the graphical bar. In FIG. 3, none of the graphical bars in column 302 are indented, which indicates all of the displayed data is for the top hierarchy level. In other embodiments, the hierarchy level may be indicated by a length of a graphical bar or other type of graphical format, such as color or thickness.

As illustrated by row 322, a second set of the data may be displayed in textual format. A user may select which data to display in the textual format. By way of example, the user may "single-click", "double-click", "right-click" or use another mechanism to indicate which rows of data should be displayed in textual format. The rows of data may or may not be contiguous to each other. The user may also be able to select to display one or more columns or one or more individual cells in textual format. The display of data in the textual format may cause the size of the cell(s) displayed in textual format to increase in order to display the text in a readable size. In some embodiments, in addition to the textual values, the graphical format may also be displayed (e.g., above/below/right/left of textual values or textual value may be displayed inside the graphical format).

A user may also be able to select to display the data for a row 324 in a status line 326. For instance, a user may position a cursor ("roll-over") on a row of data, which may cause the data viewer 300 to display the textual values of the data in status line 326. Within the table, the data may continue to be displayed in graphical format. The status line 326 could, in other embodiments, appear within the displayed table of data, at the bottom of the displayed data, or in another location. Furthermore, a row, upon selection or rollover, may be expanded in place as a "bubble" or distortion view.

As will be described in more detail with reference to FIG. 6, a user may be able to choose to limit the data displayed in the table to one or more selected rows. Thus, a filtering mechanism may be provided for the user to select which rows should be displayed. In one embodiment, the user may select rows by checking boxes in a column 330 and then clicking on a button 332 to display only the checked rows. Other mechanisms may also be used for the user to select which rows to display in the table.

Data viewer 300 may also provide the ability for a user to sort the data by a sort column 306. An indicator 340 may be displayed to show the current sort column. In some instances, indicator 340 may also indicate whether the data is sorted in ascending (e.g., up arrow indicator) or descending order (e.g., down arrow indicator). The sort column may be selected by "single-clicking" or "double-clicking" on a column header or by another mechanism. The sort order may be switched from ascending to descending (or visa versa) by selecting the sort column a second time. Data may be sorted to maintain the display of the hierarchical relationships of rows of data, so that hierarchical relationships may be easily viewed. Thus, the data may first be sorted at the highest hierarchical level. Data associated with lower hierarchical levels (descendent data) may then be sorted within their respective parent data category. In some embodiments, a secondary sorting capability may be provided in which additional columns may also be selected to sort rows by the selected additional columns.

Other functionality may also be provided by data viewer 300. As one example, a mechanism 350 may be provided for the user to expand the hierarchy to display data at all hierarchical levels associated with column 302. Another mechanism 352 may be provided for the user to collapse all hierarchical levels and only display data at the top hierarchical level. A mechanism 360 (e.g., a button) may also be provided to reset the table to a default format. As will be described in further detail below with reference to FIG. 4, a mechanism 370 may also be provided for the user to configure the display. The user may activate mechanism 350, 352, 360, 370 by clicking, double-clicking, or any other appropriate method. It should be appreciated that in other embodiments, a data viewer 300 may not include all of the functionality described above and/or may include additional functionality.

Figure 4:
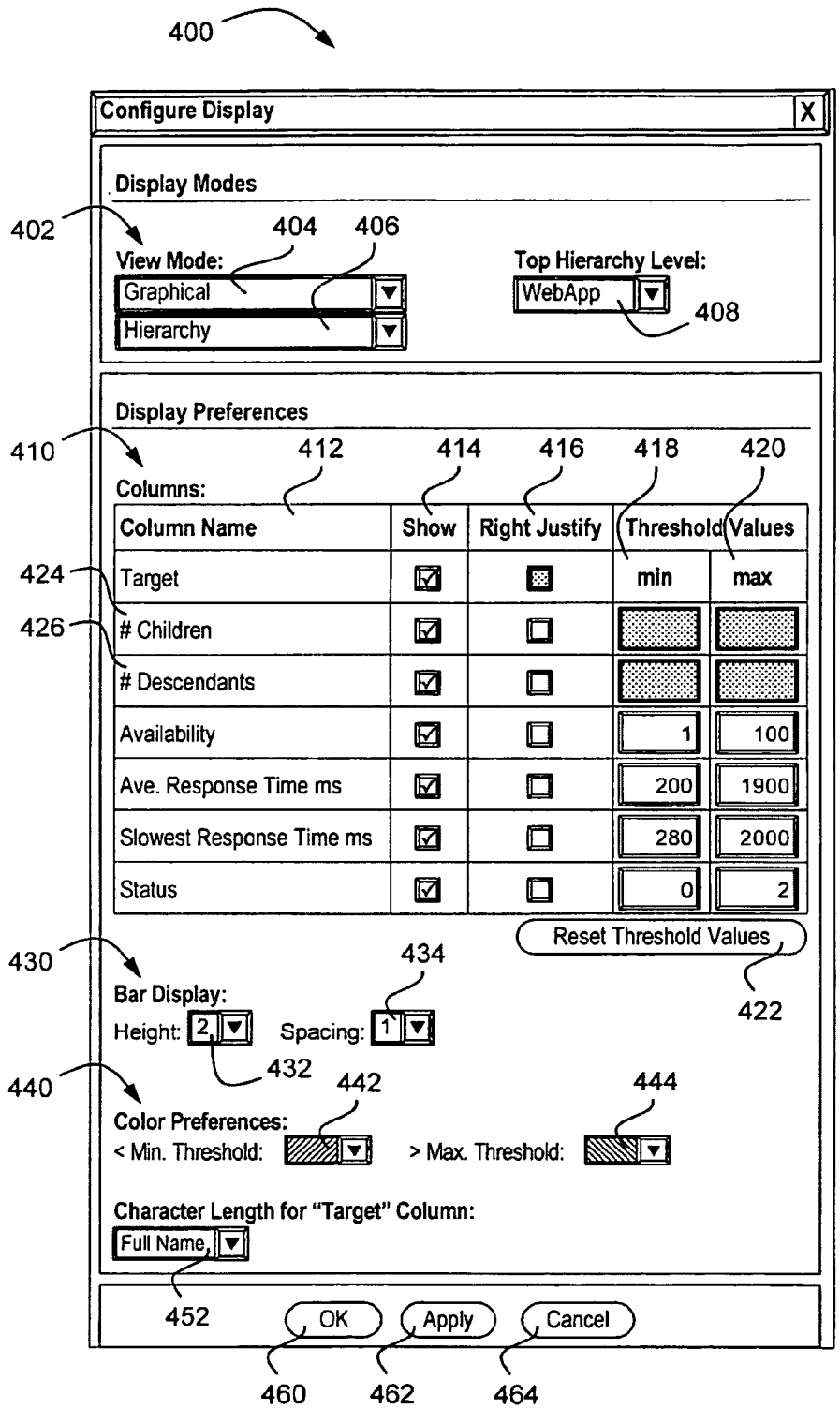
FIG. 4 illustrates an exemplary embodiment of a configuration interface that may be used to configure the display of data.

FIG. 4 illustrates an exemplary configuration interface 400, such as a window or menu, which may be invoked to allow the user to configure data display options. The configuration interface 400 may include one or more options 402, 404, and 406 to configure a display mode of the data viewer. By way of example, a first option 404 may be provided for the user to display data in graphical format, graphical format with textual values, or only textual values. Option 406 may allow the user to configure the data viewer to display the data in the hierarchical relationships or in a list format. If data is displayed in the hierarchical format, rows are displayed in accordance with their hierarchical levels and relationships. Thus, descendants are displayed consecutively with their parent rows (e.g., descendants of rows are displayed immediately following the parent row). The hierarchical relationships are maintained when the data is sorted. If the data is displayed in list format, the hierarchical relationships between rows are not maintained and data is displayed/sorted as if the hierarchy levels did not exist.

The configuration interface 400 may also provide an option for the user to configure the top hierarchy level 408 to display. Thus, the user may select to view only data at the top hierarchy level and below. Data at hierarchical levels above the selected top hierarchy level 408 is not displayed. In other embodiments, the user may select specific hierarchical levels to display or the user may select to view only data at a bottom hierarchy level and above.

One or more option(s) may also be provided in configuration interface 400 to configure display preferences. As one example, the configuration interface may include an area 410 to configure the display of the data attributes. Area 410 may include the column (attribute) names 412 available for display. For each of the columns, the user may use an indicator, such as a checkbox or other suitable mechanism, to indicate whether to display 414 the attribute. Checkboxes or other mechanisms may also be provided to configure or change the justification 416 of one or more columns (e.g., set the justification as right justify). The justification option 416 may override a default justification (e.g., left justify). As will be illustrated with reference to FIG. 7, relationships between two attributes may be more easily perceived by displaying the attributes with opposite justification. In a further embodiment, options for setting min 418 and max 420 are presented.

Additional options may also be provided to configure threshold values for one or more attributes. By way of example, options 422 may be provided for one or more of the attributes to configure a minimum threshold value. Data values that are below the minimum threshold may be displayed in a different format, such as a different color, highlighted, or otherwise visually convey that the data values fall below the minimum threshold value. Similarly, options may be provided for one or more of the attributes to configure a maximum threshold value and values above the maximum threshold value may be displayed in a different format to visually convey the data value exceeds the configured maximum threshold value. In some embodiments, an option 422 may be provided to reset the threshold values to default values.

Configuration interface 400 may also include one or more option(s) to display descendent information as attribute(s). FIG. 4 illustrates two possible options 424, 426 that may be provided to display descendent information as attributes. Child data is data at a hierarchical level directly below the hierarchical level of the parent data. The display options of the descendent attributes 424, 426 may also be configurable similar to other attributes. Although FIG. 4 illustrates an embodiment in which threshold values are not configurable for the descendent attributes 424, 426, alternate embodiments are contemplated in which threshold values may be configured.

Configuration interface 400 may further include options to configure the display of graphical values 430. By way of example, in embodiments in which the graphical values are displayed as graphical bars, a first configuration option 432 may be provided to configure the height of the graphical bars. An additional option 434 may also be provided to configure the spacing between the graphical bars. In other embodiments, configuration interface 400 may include options to change the format of the graphical display and/or appropriately configure different types of graphical formats.

As previously described, threshold values may be configured for one or more attributes. An area may be provided to configure the format of data that is below minimum threshold values or above maximum threshold values. In one embodiment, area 440 may be used to configure the color to display values outside the threshold parameters. A first option 442 may be provided to select the color to display values below minimum thresholds and a second option 444 may be provided to select the color to display values above maximum thresholds. Alternately, the color preferences 442, 444 may be set differently for each attribute. In alternate embodiments, configuration interface 400 may provide other types of formatting choices, such as highlighting or blinking, to display values outside thresholds. Additionally, in some embodiments, threshold values may be set for specific rows and/or hierarchy levels. In these cases, the threshold settings for rows may supersede those specified for a column in those intersecting data elements defined by a row and column.

Configuration interface 400 further provides a configuration option 452 to configure the display length of character data when the display length is in non-graphical format. In the exemplary embodiment of web performance data, the character data is limited to the "target" attribute but, in alternate embodiments, additional attributes may also be character data. A user may be able to select from a drop-down list or other mechanism to display the character data full length, or other lengths, such as 5, 10, or 15 characters. The chosen option may change the displayed width of columns associated with character data. By configuring the display length of character data, users may decide between seeing more detailed information (full character name) at the expense of more screen space (possibly necessitating scrolling) or less detailed information with less screen space taken up by the character data.

After a user has completed use of the configuration interface 400, a mechanism 460 (e.g., an "OK" button) may be provided to apply all the changes made, close the configuration interface, and re-display the data using the selected configuration options. A second mechanism 462 (e.g., an "Apply" button) may be provided to apply the changes made, but continue the display of configuration interface 400 for potential additional changes. A third mechanism 464 (e.g., a "Cancel" button) may be provided to undo any configuration changes made, close the configuration interface 400, and return to the previous display of data.

It should be appreciated that in alternate embodiments, configuration interface 400 may include fewer, additional, or different options than those discussed with reference to FIG. 4. As one example, options may be provided in configuration interface 400 or a separate configuration interface to configure hierarchy levels and/or the hierarchy column. Other option(s) may be provided to format or configure the graphical display of data. By way of example, a user may be able to select whether to display the hierarchical values and/or character data in graphical format by indenting or by changing the length of a graphical bar. Other configuration options to configure the display and formatting of data are also contemplated.

Figure 5:
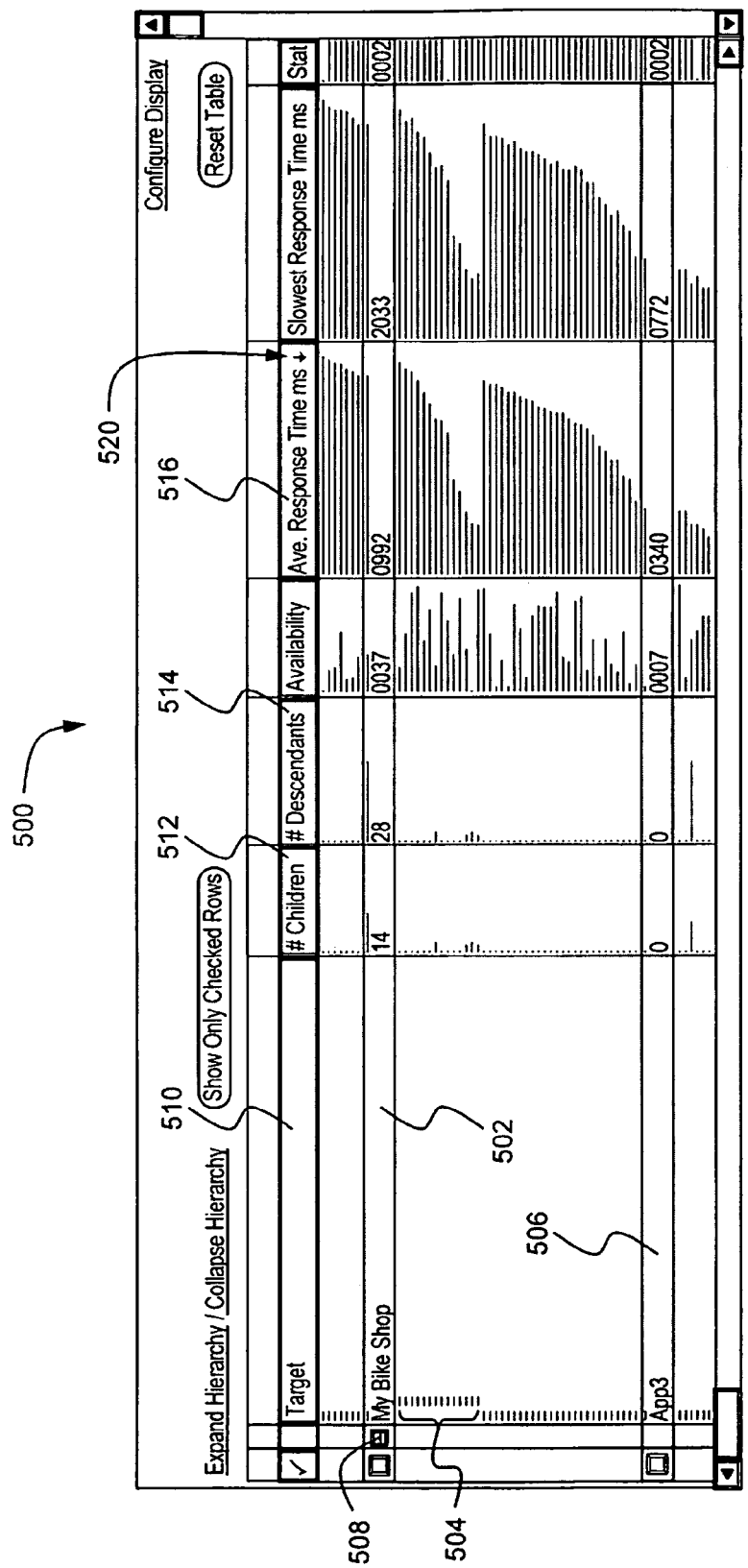
FIG. 5 illustrates a second exemplary display of data using a data viewer.

FIG. 5 illustrates another view 500 of data that may be displayed using a data viewer. In this view, the hierarchical levels have been expanded for row 502 having a target attribute "My Bike Shop". Thus, data associated with lower hierarchical levels of the hierarchical column "Target" 510 are displayed in rows 504. Each of the displayed rows 504 is at one hierarchical level below "My Bike Shop", as can be seen by the indented position of the graphical display of the data values for the target attribute in these rows 504.

Descendent information is displayed as attributes in columns 512, 514. Column 512 displays the number of children (direct descendents that are at one hierarchical level below the associated row data) and column 514 displays the total number of descendents. "My Bike Shop" displayed in row 502 has 14 children (displayed in rows 504) and 28 total descendents. As can be appreciated, one or more of the target data values in rows 504 also has descendents.

A mechanism 508 is displayed to provide the user the ability to collapse the display of the hierarchical data, so that descendent rows 504 of row 502 are not displayed. Mechanism 508 may also indicate (e.g., by a minus sign) row 502 has been expanded to display descendent rows 506. If mechanism 508 is activated to collapse the display of hierarchical data, the display of mechanism may change to indicate that descendent data exists (e.g., changed to a plus sign) and mechanism 508 may then be used to expand the data to display the descendents 504. In the illustrated embodiment, mechanisms are not displayed to indicate whether a row has descendent data when the data is displayed in graphical format (as currently illustrated by rows 504). Mechanisms, such as mechanism 508, are displayed when the data is in textual format (row 502). A mechanism is not displayed for row 506 (associated with target attribute value "App3") as row 506 has no descendents. This may provide for the conservation of screen space. However, alternate embodiments may display or otherwise indicate which rows have descendent data when the data is in graphical format. Additionally, in some embodiments, the expansion of a row of data to display data at lower hierarchy levels may result in the expansion of all descendents, not just child descendents.

The data displayed in data viewer 500 is currently being sorted in descending order by the average response time attribute 516 as indicated by an indicator 520 (e.g., down arrow) displayed in the header of column 516. Data is sorted according to hierarchical levels. First, the data at the top hierarchy level is sorted by the sort column 516. Descendent data at hierarchy levels below the top hierarchy level are then sorted within their respective parent hierarchy level. Thus, the display of the hierarchical relationships between rows of data is maintained. In FIG. 5, all data rows at the top target hierarchy level, including 502, 506 are sorted by the average response time 516. Rows 504 are sorted by average response time 516 within their parent target of "My Bike Shop" associated with row 502. Optionally, a second column header could be selected as a secondary sort key, which would specify sorting in case of ties on the preceding sort.

FIG. 6 illustrates a filtered view 600 of data that may be displayed using a data viewer. Displayed data is limited to rows 610. Rows 610 may have been selected for display by a user by using a mechanism, such as a checkbox, to indicate the selected rows and then using another mechanism, such as button 602 to select to display only the checked rows. Other suitable mechanisms may also be used to indicate which data should be displayed in the filtered view 600. A mechanism, such as button 630, may also be provided to reset the displayed data to include the data excluded by the filtered view 600.

The selected data 610 includes the data associated with target "My Bike Shop" (row 612) and two rows 612, 614 having descendent data. A minus sign 622 is displayed to indicate the data associated with row 612 (target "My Bike Shop") has descendent data associated with it and that the data display is currently expanded to display the descendent data. By clicking on the minus sign 622, the user may collapse the display of the descendent data associated with "My Bike Shop". Similarly, a plus sign 624 is displayed to indicate the data associated with row 614 (target "Storefront Page", which is a child of "My Bike Shop") has associated descendent data and that the descendent data is not currently displayed. A user may click on the plus sign 624 to expand the displayed data to include the descendent data. It should be appreciated that alternate mechanisms may also be used to expand/collapse the display of descendent data and/or to indicate whether the descendent data is currently displayed.

Figure 7:
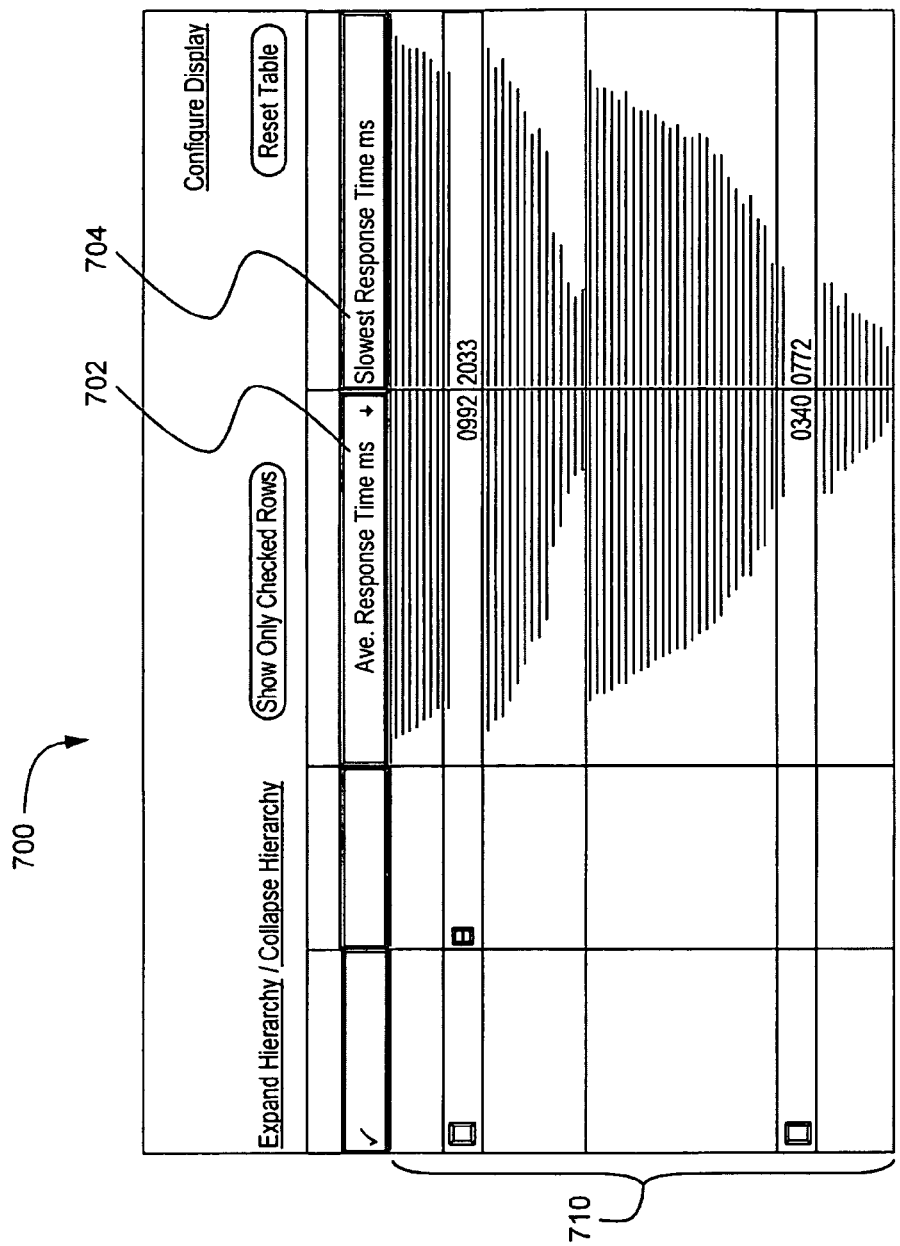
FIG. 7 illustrates a fourth exemplary display of data using a data viewer.

FIG. 7 illustrates another view 700 of data that may be displayed using a data viewer. View 700 includes a column 702 displaying values for the average response time attribute for a plurality of rows of associated data 710. A second column 704 is used to display the slowest response time attribute values. The average response time 702 values are right justified and the slowest response time values displayed in column 704 are left justified.

For the data displayed as graphical bars, the reverse justification of columns 702, 704 may produce a tree effect for the data values. This type of display may facilitate the perception of relationships between the data values of these columns. In the example data of FIG. 7, the reverse justification may have assisted a user to see that a high average response time (values in column 702) is generally correlated to a high slowest response time (values in column 704) and visa versa. It should be appreciated that additional columns may also displayed, some of which may also be displayed using reverse justification.

Figure 8:
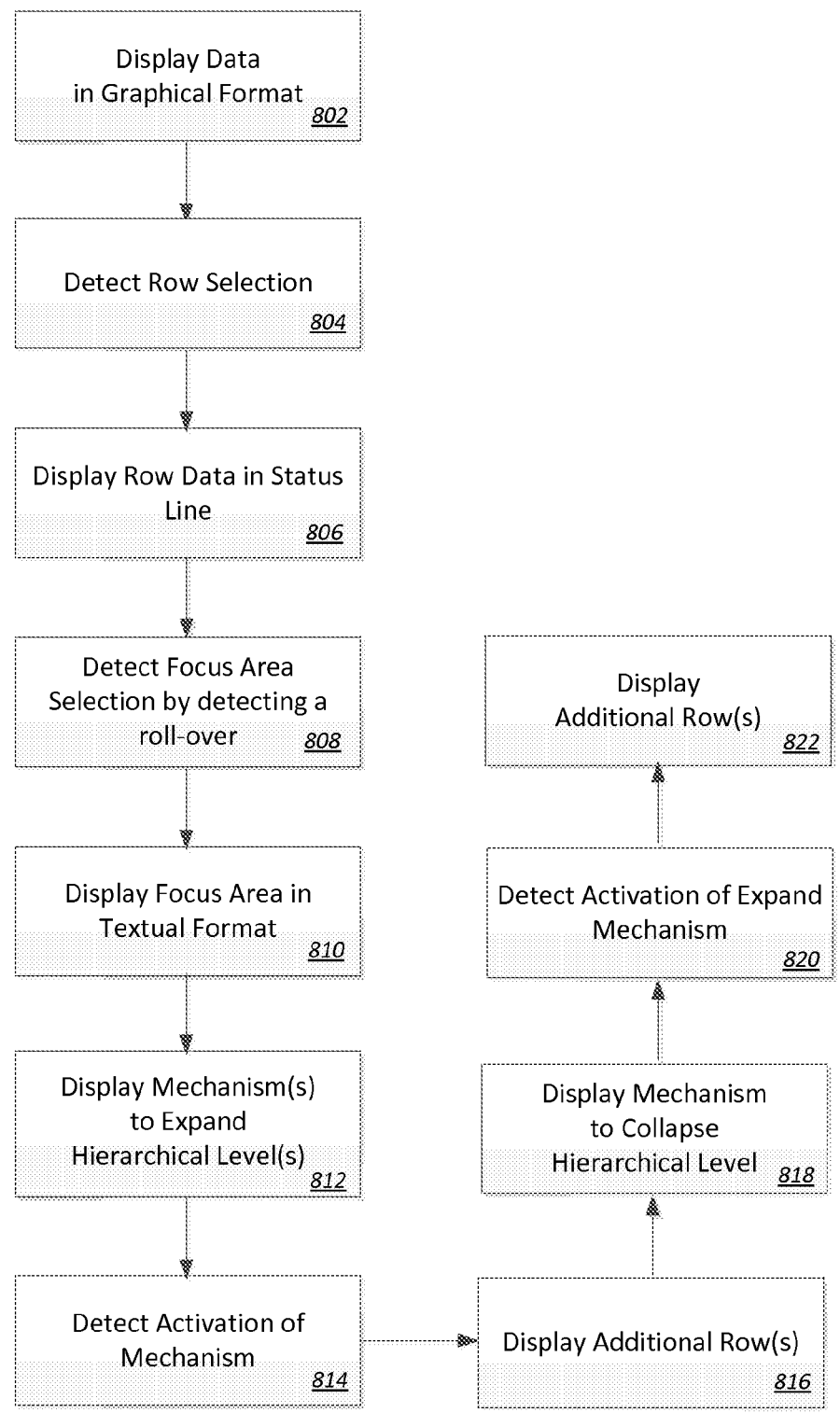
FIG. 8 is a flow diagram illustrating an exemplary method of using a data viewer to display data.

FIG. 8 illustrates an exemplary method of interacting with a data viewer to display data. The method may begin by displaying 802 multiply-dimensioned data having multiple hierarchy levels. The data values may be displayed in a table format having a plurality of rows for displaying associated data (e.g., a data record), a plurality of columns for displaying data attributes, and a plurality of cells for displaying the data values. At least a portion of the data values are displayed in a graphical format (e.g., graphical bars). One of the columns may include data having at least two hierarchical levels. The graphical format of the data in this column may indicate the hierarchy level of the data value (e.g., by indenting graphical bars or increasing the length of graphical bars to indicate a lower hierarchy level). In some embodiments, when the data is initially displayed 802, the display may be limited to the data rows having values in the hierarchical column at a top hierarchy level.

The selection of a row of data may be detected 804. A user may have selected a row by "clicking" on a row of data. One or more of the attribute values for the data may be displayed in graphical format. Upon detection 804 of the data selection, the data values may be displayed 806 in a status line in textual format.

The method may also include the detection 808 of a focus area selection (e.g., by detecting a "roll-over" or other mechanism activated by a user to select a focus area). The data selected for focus may have been displayed 802 in graphical format. Upon detection 808 of the focus area selection, the data associated with the selected focus area may be re-displayed 810 in textual format. In some instances, the size of the cell or row displaying the data values may increase to accommodate the display of the textual data in a readable size. In other embodiments, this displayed row may appear at the bottom of or floating over the displayed graphical table image. Thus, in some cases, the entire table image or other portions of the table image may need to be re-displayed.

One or more of the rows of data selected in the focus area may have associated descendent data (data at a lower hierarchy level than the value in the row's hierarchical column that shares at least one common data dimension with the value). A mechanism 812 may be displayed for each of these rows to allow a user to view the descendent data. Alternately, mechanism(s) may be displayed for all rows having descendent data, regardless of whether the data in the row is displayed in textual or graphical format.

An activation of one of the mechanisms of the rows is detected 814. The additional descendent data associated with the row having the activated mechanism is displayed 816. By way of example, the descendent data rows may be displayed as rows immediately below the parent data row. In some embodiments, the activation of the mechanism may result in only the display of child data rows (e.g., data at a hierarchical level immediately below the parent data). The mechanism associated with the parent row may be changed to display 818 a mechanism to collapse the display and remove the descendent rows of data from the displayed data.

The method may further include the detection 820 of the activation of an expand all hierarchy levels mechanism. This may result in the display 822 of all additional rows of data at all hierarchy levels. These additional rows may be displayed 822 immediately following the parent rows to indicate the hierarchical relationships between the rows. By way of example, the descendent data may be displayed 822 as indented graphical bars or other symbols, the indented position indicating the hierarchical level of the descendent data.

It should be appreciated that in alternate embodiments, a great number of variations may be made to the exemplary method described above. For instance, the method may not include all of the illustrated blocks or the blocks may be performed in a different order. As another example, additional or different interactions may occur that use the same or additional functionality provided by a data viewer.

Figure 9:
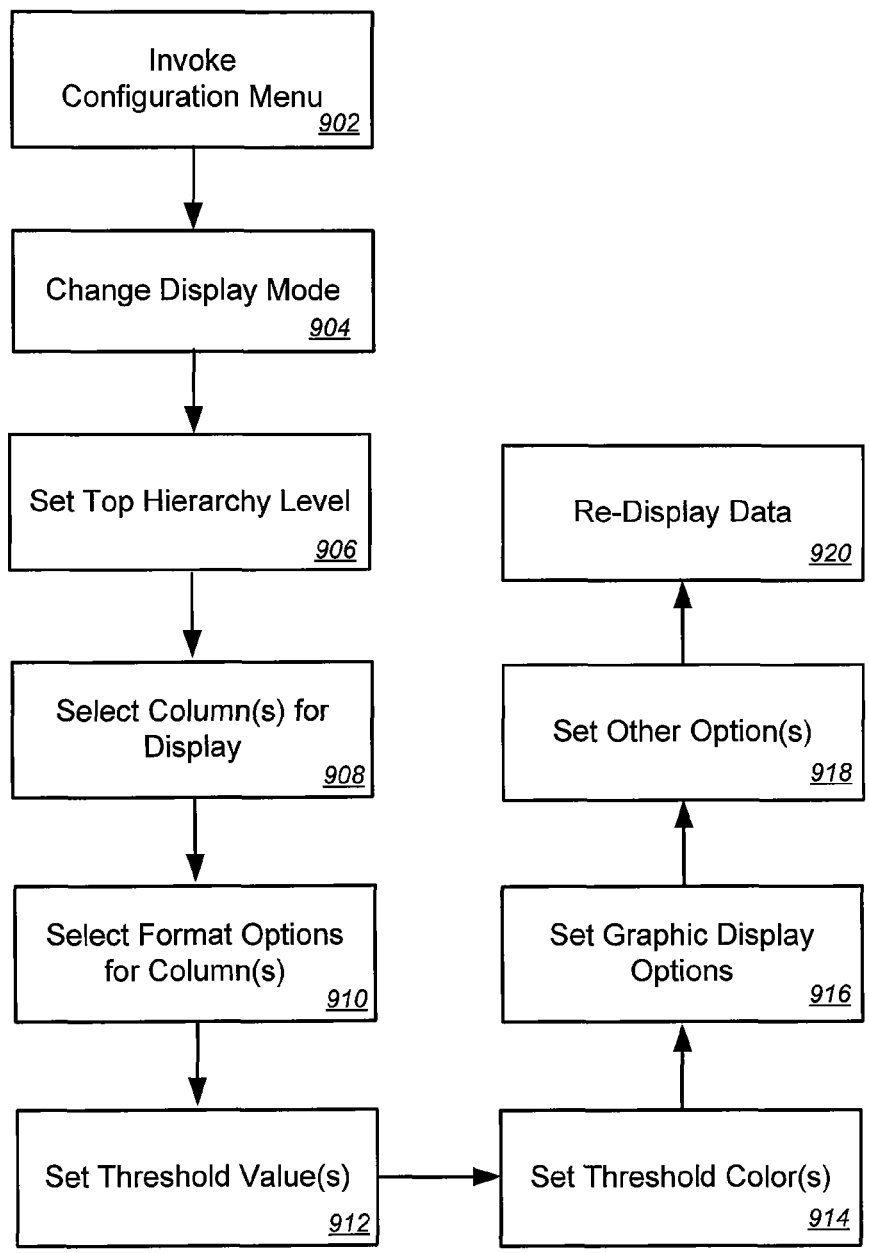
FIG. 9 is a flow diagram illustrating an exemplary method that may be used to configure a data viewer.

FIG. 9 illustrates an exemplary method that may be used to configure a data viewer. The method may begin by invoking 902 a configuration interface. The invocation 902 of the configuration interface may be in response to a user request to configure the display of the data. The configuration interface includes a plurality of configuration options to change the manner in which data in the data viewer is displayed.

Selection(s) may then be received to change one or more of the configuration options. One of the received changes may be to change 904 a display mode configuration option. By way of example, the display mode configuration selection may be to display the data previously displayed in the graphical format in a graphical format with textual values (e.g., displaying textual values above/below, left/right, or within graphical format). Another configuration option may be received to set 906 the top hierarchy level for the displayed data. This option may result in the display of data including only the data at hierarchical levels at or below the configured top hierarchy level. In other embodiments, configuration options may allow the user to set specific hierarchy levels for display, or may allow display of data at a specified or higher level of hierarchy.

The method may also include receiving configuration option(s) selecting 908 the columns (data attributes) to be displayed in the data viewer. Thus, columns associated with data attributes may be added or removed from the display according to the preferences of the user. In some instances, the user may also select 908 to display columns indicating a number of children and/or descendents of data. Format options (e.g., justification) for columns may also be selected 910 using the configuration interface.

Additional configuration options may be received to set 912 threshold values for data. Maximum and/or minimum threshold values may be set 912 for one or more of the attributes. Data that exceeds maximum threshold values or is less than minimum threshold values may be displayed in a different format to indicate the data is outside a threshold value. In one embodiment, the data may be displayed in a different color. Thus, a configuration option may be received to set 914 the color(s) to display data that falls outside threshold values. In alternate embodiments, different or additional formatting options may be set to display values outside threshold parameters.

Graphic display option(s) may also be set 916. For instance, graphic display option(s) may be set to indicate a graphical format to use to display graphical values. In some embodiments, the graphical format may be horizontal graphical bars. In these embodiments, graphical display option(s) may be set to change the vertical height and/or spacing of the graphical bars. Thus, the user may decide whether to display larger amounts of data (using smaller vertical heights and spacing) or to display less data that may possibly be more comprehensible to a user, but may necessitate scrolling to view all data.

Additional configuration option(s) may also be set 918, such as option(s) previously described with reference to FIG. 4. The data may then be re-displayed 920 in accordance with the configuration options selected 904-918.

Figure 10:
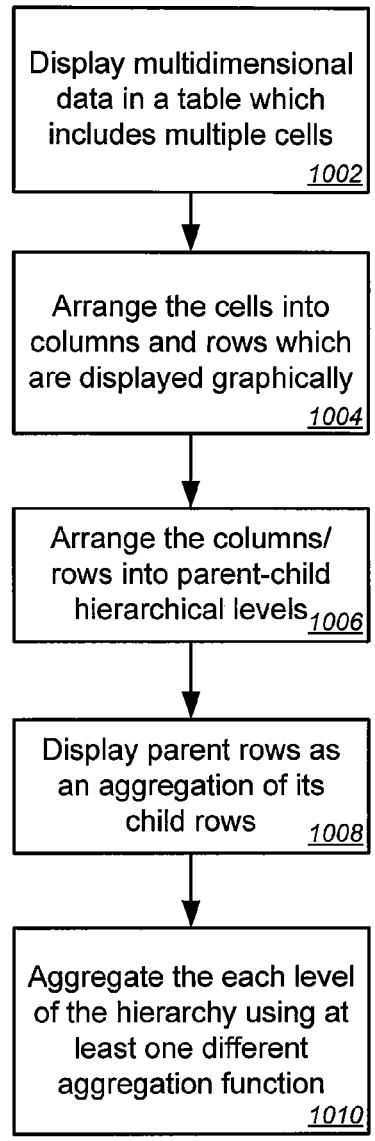
FIG. 10 is a flow diagram illustrating a method of graphically displaying aggregated hierarchical parent-child data, according to one embodiment of the present invention.

Turning now to FIG. 10 which illustrates a method of graphically displaying aggregated hierarchical parent-child data, according to one embodiment of the present invention. At process block 1002, multiply-dimensioned data may be displayed in a table (or data viewer) which includes multiple cells. In one embodiment, the table may be displayed on a graphical display device (e.g., a CRT monitor, a television, an LCD screen, a Plasma screen, etc.). Each cell within the table may filled with data in any format. For example, the data may be textual, graphical, in multiple colors, black and white, grayscale, etc. The data may be displayed using graphs (e.g., pie charts, bar graphs, line graphs, picture graphs, etc.), or other graphical representations. Furthermore, the graphical representations may be displayed in two or three dimensions.

At process block 1004, the cells within the table may be arranged in columns and/or rows which can be used to graphically display the data. In one embodiment, the columns and/or the rows may be arranged in a parent-child hierarchy (process block 1006). For example, a parent row may have multiple child rows which are arranged subordinately to the parent row. The child rows may be arranged as the rows directly below the parent row. In one embodiment, the child rows may be indented from the parent row or, alternatively, the child rows may be color-coordinated differently from the parent row. The child rows may also be configured to be folded or rolled into the parent row using, for example, using a plus/minus icon.

In a further embodiment, any parent row/column may also be a child to another column/row, as well as any child column/row may be a parent column/row. As such, a complete hierarchy of columns/rows may be constructed using the table and the cells.

At process block 1008, the value of parent rows/columns may be displayed as an aggregation of the associated child rows/columns. For example, a parent row may have three child rows below it in the hierarchy. Furthermore, each of the children have a data value of one, five, and ten, respectively. Hence, depending on the aggregation function (e.g., sum, average, mean, medium, maximum, minimum, etc.) used, the parent row would be an aggregation of the three child rows. For example, if a sum aggregation function was used, then the parent of the three children would have the value of sixteen (i.e., one plus five plus ten). Alternatively, if an average function was used for aggregation, then the parent row would have the value of 5.3. Accordingly, depending on the aggregation function used, the parent row's value would change. It should be noted that many more child rows may be included and any appropriate aggregation function may be used.

In a further embodiment, each child row may be an aggregation of child rows below (in other words the child row may be a parent row as well). Furthermore, each child row may use a different aggregation function as well as each level of the hierarchy may also use a different aggregation function (process block 1010). For example, assuming there are five levels of the hierarchy (nonetheless, more or less hierarchy levels may be used), each level may be aggregated using a different aggregation function (i.e., the first level using a summing function, the second level using an average function, and so forth). Such that the aggregation function used for each child, parent, or level of the hierarchy may be completely customizable.

In an alternative embodiment, the aggregation may be computed "on-the-fly." In other words, as the data is being displayed on the display device, the aggregation for each row or column may be calculated and then displayed. For example, a set of low-level data may initially be supplied to the aggregation function and then, based on the data received for each cell, further computations may be performed. Alternatively, the data may be aggregated using completely pre-defined data sets, such that for each cell, the aggregation computations have been done prior to displaying (e.g., OLAP, data cube model, etc.).

In a further embodiment, a user or administrator may be presented with a configuration menu which allows the user to set aggregation options for the table. For example, the user may be able to define the aggregation functions used for each row or column in the table, for each parent and child in the table, as well as each level of the hierarchy. With each level of the hierarchy being defined by a different aggregation function, the top level may use a mean function, the next level may use an average function, then a medium function, and so forth. Accordingly, at any location within the table, for any cell, row, or column, and any level of the hierarchy, the aggregation function may be defined and may be different from any other location within the table. In other words, the aggregation functions used may produce a type of heterogeneous aggregation of the hierarchy using different aggregation functions throughout the hierarchy.

Figure 11:
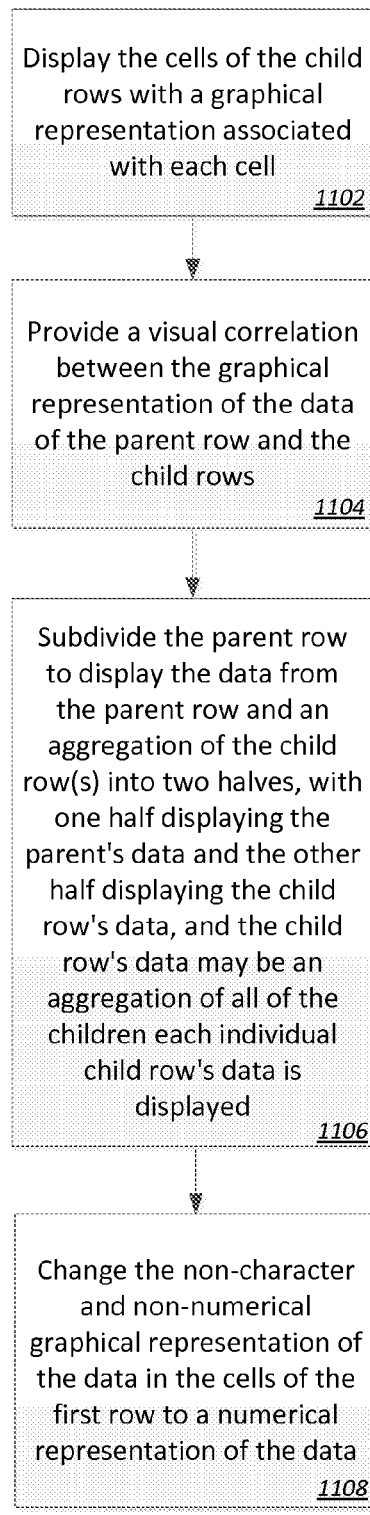
FIG. 11 is a flow diagram illustrating a method of graphically displaying aggregated hierarchical parent-child data, according to another embodiment of the present invention.

Referring now to FIG. 11 which illustrates a method of graphically displaying aggregated hierarchical parent-child data, according to a further embodiment of the present invention. At process block 1102, the cells of the child rows may be displayed with a graphical representation associated with each cell. For example, the graphical representation may be in the form of a bar chart, a pie chart, a line graph, a picture chart, etc.

Furthermore, the graphical representation may be displayed on a relative basis. For example, if the graphical representation is a bar chart, then the each level in the hierarchy may be represented with a different length bar chart depending on the value within the row or column. As such, the length of the bar for each child may be displayed relative to, for example, the parent. Alternatively, the scale of the bars may be displayed relative to an absolute value or a set value (e.g., 100,000 units, fifteen data points, etc.).

Additionally, scaling may be defined across columns and/or rows. For example, the length of a bar in a column may be scaled relative to the length of all bars in the table, or a select number of bars in the table, etc. Accordingly, columns A and B may be scaled relative to each other and columns C and D may be scaled relative to each other such that the two scalings for columns A and B are different from the scaling for C and D. Furthermore, the scaling may be related to the aggregation function used. For example, an average aggregation may use an average scaling, while a summing function may use an absolute scaling. Nonetheless, any combination of scaling, aggregation, or both may be used.

At process block 1104, a visual correlation between the graphical representation of the parent rows and the child rows may be provided. For example, the parent's graphical representation may be dependant on the child rows associated with the parent. Additionally, each child row's graphical representation may be dependent on other child rows.

At process block 1106, a parent (or child) row may be subdivided in order to display multiple levels of the hierarchy. For example, a parent row may be divided into two halves, with one half displaying the parent's data and the other half displaying the child row's data. The child row's data may be an aggregation of all of the children, or alternatively each individual child row's data may be displayed. Alternatively, a subset of the child may be displayed, or an aggregation of a subset of the children may be displayed. Furthermore, the subdivided display may be on a rolling basis, such that each row displays its own data as well as the child row immediately below it in the hierarchy.

In a further embodiment, the cells may be represented in multiple dimensions. For example, the parent row can be represented as being displayed "into" the screen, while the child rows are displayed as "coming out" of the screen, or visa versa. Alternatively, the parents and children may be represented in three-dimensions, such that any parent-child combination may be represented three-dimensionally having the parent and children each in a different dimension of the screen.

In further embodiments, parent and child levels of the hierarchy may be represented by indented bars on the screen. For example, the parent's bar may be left justified while the child bars are progressively indented to the right of the screen. The parents and children may be represented by different colors, different graphical representations, etc. Ultimately, the parent and child rows may be dynamically represented based on their level within the hierarchy.

In the foregoing description, for the purposes of illustration, methods were described in a particular order. It should be appreciated that in alternate embodiments, the methods may be performed in a different order than that described. Additionally, the methods may include fewer, additional, or different blocks than those described. The methods may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of displaying graphical representations of multiply-dimensioned data, the method comprising:

displaying multiply-dimensioned data in a table format, the table format comprising a plurality of cells arranged in a plurality of rows and a plurality of columns, one or more cells of the plurality of cells being capable of displaying data graphically, and a column of the plurality of columns having at least two hierarchical levels, the at least two hierarchical levels comprising a parent hierarchical level and a child hierarchical level, wherein a display of a non-character and non-numerical based graphical representation of data at a parent row of the plurality of rows at the parent level represents an aggregating of data from child rows of the plurality of rows at the child level, wherein the aggregation of the data comprises using one or more aggregation functions, wherein the aggregation function for at least one child row differs from the aggregation function for at least one parent row;

displaying in each cell of one or more cells of the plurality of cells of the child rows, wherein the non-character and non-numerical graphical representation of the data is associated with the cell;

automatically providing, using a processor, a visual correlation within the plurality of cells between the display of the non-character and non-numerical graphical representation of the data of the parent row and the display of the non-character and non-numerical graphical representation of the data of the child rows, wherein the displaying of the non-character and non-numerical based graphical representation of the parent hieratical level and child hierarchal level comprises displaying graphical bars indented to indicate the respective hierarchal level of the data in the respective parent or child rows, and wherein each cell of the plurality of columns in the child hierarchal level comprises at least one of the graphical bars;

detecting a mouse rollover event for a first row;

changing, in response to the mouse rollover event, the non-character and non-numerical graphical representation of the data in the cells of the first row to a numerical representation of the data; and dividing a parent row horizontally into two halves, wherein a first half displays the data of the parent row as a graphical bar, and wherein a bottom half displays the aggregated data of the respective child rows in textual format.

2. The method of claim 1, wherein the one or more aggregation functions comprise at least one or more of the following: a sum function, an average function, a mean function, a median function, a maximum function, a minimum function, and a statistical function based on data distribution of one or more columns in the table.

3. The method of claim 2, wherein the at least one of the child rows utilizes the average function for aggregation and the at least one parent row utilizes the sum function for aggregation.

4. The method of claim 2, further comprising:
dynamically selecting the aggregation function for each row based at least in part on one or more of the following: the level of the row in the hierarchy, a number of child rows associated with the row, a number of parent rows above the child row in the hierarchy, and the row's numeric value.

5. The method of claim 2, further comprising providing a user with an interface configured to receive input, wherein the input defines the aggregation function for each row.

6. The method of claim 1, wherein the graphical representation comprises one or more of the following: a line graph, a histogram, and a picture chart.

7. The method of claim 6, wherein the displaying the graphical representation from at least one child differs from the displaying of the graphical representation of at least one parent.

8. The method of claim 1, wherein the aggregation of the data is performed simultaneously with the providing of the visual correlation.

9. The method of claim 1, wherein the aggregation of the data is performed using pre-defined aggregation computations computed prior to the providing of the visual correlation.

10. The method of claim 1, further comprising scaling the graphical representation of the data for each of the plurality of rows.

11. The method of claim 10, wherein the scaling comprises one or more of the following scaling functions: absolute scaling, set width scaling, scaling relative to child and parent rows associated with the row, and cross column scaling.

12. The method of claim 11, wherein the scaling of the graphical representation of the data for at least one child row differs from the scaling of at least one parent row.

13. The method of claim 11, wherein a scaling function selected for a row is based at least in part on an aggregation function used for the row.

14. The method of claim 1, wherein the graphical representation for a row represents the row and at least one child row or parent row.

15. The method of claim 1, further comprising:
detecting an activation of a mechanism associated with the plurality of rows, the plurality of rows having cell data in a column at the parent hierarchical level; and
displaying one or more of the plurality of rows having data in the column at the child hierarchical level, the data at the child hierarchical level sharing at least one data dimension with the cell data.

16. A non-transitory machine-readable medium having sets of instructions stored thereon which, when executed by a machine, cause the machine to:
display multiply-dimensioned data in a table format, the table format comprising a plurality of cells arranged in a plurality of rows and a plurality of columns, one or more cells of the plurality of cells being capable of displaying data graphically, and a column of the plurality of columns having at least two hierarchical levels, the at least two hierarchical levels comprising a parent hierarchical level and a child hierarchical level, wherein a display of a non-character and non-numerical based graphical representation of data at a parent row of the plurality of rows at the parent level represents an aggregating of data from child rows of the plurality of rows at the child level, wherein the aggregation of the data comprises using one or more aggregation functions, wherein the aggregation function for at least one child row differs from the aggregation function for at least one parent row;
display in each cell of one or more cells of the plurality of cells of the child rows, wherein the non-character and non-numerical graphical representation of the data is associated with the cell; and
automatically provide, using a processor, a visual correlation within the plurality of cells between the display of the non-character and non-numerical graphical representation of the data of the parent row and the display of the non-character and non-numerical graphical representation of the data of the child rows, wherein the displaying of the non-character and non-numerical based graphical representation of the parent hieratical level and child hierarchal level comprises displaying graphical bars indented to indicate the respective hierarchal level of the data in the respective parent or child rows, and wherein each cell of the plurality of columns in the child hierarchal level comprises at least one of the graphical bars;
detect a mouse rollover event for a first row;
chance, in response to the mouse rollover event, the non-character and non-numerical graphical representation of the data in the cells of the first row to a numerical representation of the data; and
divide a parent row horizontally into two halves, wherein a first half displays the data of the parent row as a graphical bar, and wherein a bottom half displays the aggregated data of the respective child rows in textual format.

17. The non-transitory machine-readable medium of claim 16, wherein the one or more aggregation functions comprise at least one or more of the following: a sum function, an average function, a mean function, a medium function, a maximum function, and a minimum function.

18. The non-transitory machine-readable medium of claim 17, wherein the at least one of the child rows utilizes the average function for aggregation and the at least one parent row utilizes the sum function for aggregation.

* * * * *

UNITED STATES PATENT AND TRADEMARK OFFICE
CERTIFICATE OF CORRECTION

PATENT NO. : 8,402,361 B2  
APPLICATION NO. : 12/241116  
DATED : March 19, 2013  
INVENTOR(S) : Goldberg Page 1 of 1

It is certified that error appears in the above-identified patent and that said Letters Patent is hereby corrected as shown below:

In the Claims

In column 16, line 48, in Claim 1, delete "hieratical" and insert -- hierarchical --, therefor.

In column 16, line 49, in Claim 1, delete "hierarchal" and insert -- hierarchical --, therefor.

In column 16, line 50-51, in Claim 1, delete "hierarchal" and insert -- hierarchical --, therefor.

In column 16, line 53, in Claim 1, delete "hierarchal" and insert -- hierarchical --, therefor.

In column 18, line 31, in Claim 16, delete "hieratical" and insert -- hierarchical --, therefor.

In column 18, line 32, in Claim 16, delete "hierarchal" and insert -- hierarchical --, therefor.

In column 18, line 33-34, in Claim 16, delete "hierarchal" and insert -- hierarchical --, therefor.

In column 18, line 36, in Claim 16, delete "hierarchal" and insert -- hierarchical --, therefor.

In column 18, line 39, in Claim 16, delete "chance," and insert -- change --, therefor.

Signed and Sealed this  
Ninth Day of July, 2013

Teresa Stanek Rea  
*Acting Director of the United States Patent and Trademark Office*